United States Patent
Usami et al.

(10) Patent No.: US 12,120,281 B2
(45) Date of Patent: Oct. 15, 2024

(54) SCANNING APPARATUS, METHOD, AND STORAGE MEDIUM

(71) Applicant: CANON KABUSHIKI KAISHA, Tokyo (JP)

(72) Inventors: Kenta Usami, Ibaraki (JP); Masahiro Kajimoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/452,473

(22) Filed: Aug. 18, 2023

(65) Prior Publication Data
US 2024/0073343 A1 Feb. 29, 2024

(30) Foreign Application Priority Data
Aug. 23, 2022 (JP) .................. 2022-132247

(51) Int. Cl.
*H04N 1/00* (2006.01)
*H04N 1/32* (2006.01)

(52) U.S. Cl.
CPC ..... *H04N 1/32128* (2013.01); *H04N 1/00212* (2013.01); *H04N 1/00225* (2013.01)

(58) Field of Classification Search
None
See application file for complete search history.

(56) References Cited

U.S. PATENT DOCUMENTS

| | | | | |
|---|---|---|---|---|
| 11,172,338 B1* | 11/2021 | Cheung | ................... | H04W 4/14 |
| 11,256,387 B1* | 2/2022 | Huff | ...................... | G06F 16/958 |
| 2013/0159878 A1* | 6/2013 | Kim | ...................... | G06F 3/0482 |
| | | | | 715/752 |
| 2013/0311329 A1* | 11/2013 | Knudson | ............ | G06Q 30/0639 |
| | | | | 705/26.9 |
| 2014/0222916 A1* | 8/2014 | Foley | .................... | G06F 16/176 |
| | | | | 709/204 |
| 2015/0156159 A1* | 6/2015 | Hanson | ............. | H04M 1/72439 |
| | | | | 709/204 |
| 2020/0364727 A1* | 11/2020 | Scott-Green | ......... | G06Q 50/265 |
| 2021/0044551 A1* | 2/2021 | Cohen | ................... | H04L 51/216 |
| 2021/0195060 A1* | 6/2021 | Hasegawa | .......... | H04N 1/00411 |
| 2021/0385184 A1* | 12/2021 | Dalonzo | ............... | H04L 51/046 |
| 2022/0147304 A1* | 5/2022 | Tanimoto | ............... | G06Q 10/20 |
| 2022/0206677 A1* | 6/2022 | Zadina | ............... | G06F 16/9535 |
| 2022/0239986 A1* | 7/2022 | Kang | ...................... | H04L 51/04 |
| 2023/0009446 A1* | 1/2023 | Mun | ...................... | H04L 65/65 |

FOREIGN PATENT DOCUMENTS

| | | | | |
|---|---|---|---|---|
| JP | 2019068128 | * | 4/2019 | ............. B41J 29/38 |
| JP | 2021078084 A | | 5/2021 | |

* cited by examiner

*Primary Examiner* — Beniyam Menberu
(74) *Attorney, Agent, or Firm* — Canon U.S.A., Inc. IP Division

(57) ABSTRACT

A scanning apparatus includes a scanning unit configured to scan a document to generate image data, and a transmission unit configured to transmit to a chat server the image data generated by the scanning unit and a request to display information indicating that the image data is posted at a predetermined position on a screen in a talk room even if a message is posted to the talk room after the image data is posted to the talk room. The image data transmitted by the transmission unit is posted to the talk room, and the information indicating that the image data is posted is displayed at the predetermined position on the screen in the talk room.

13 Claims, 16 Drawing Sheets

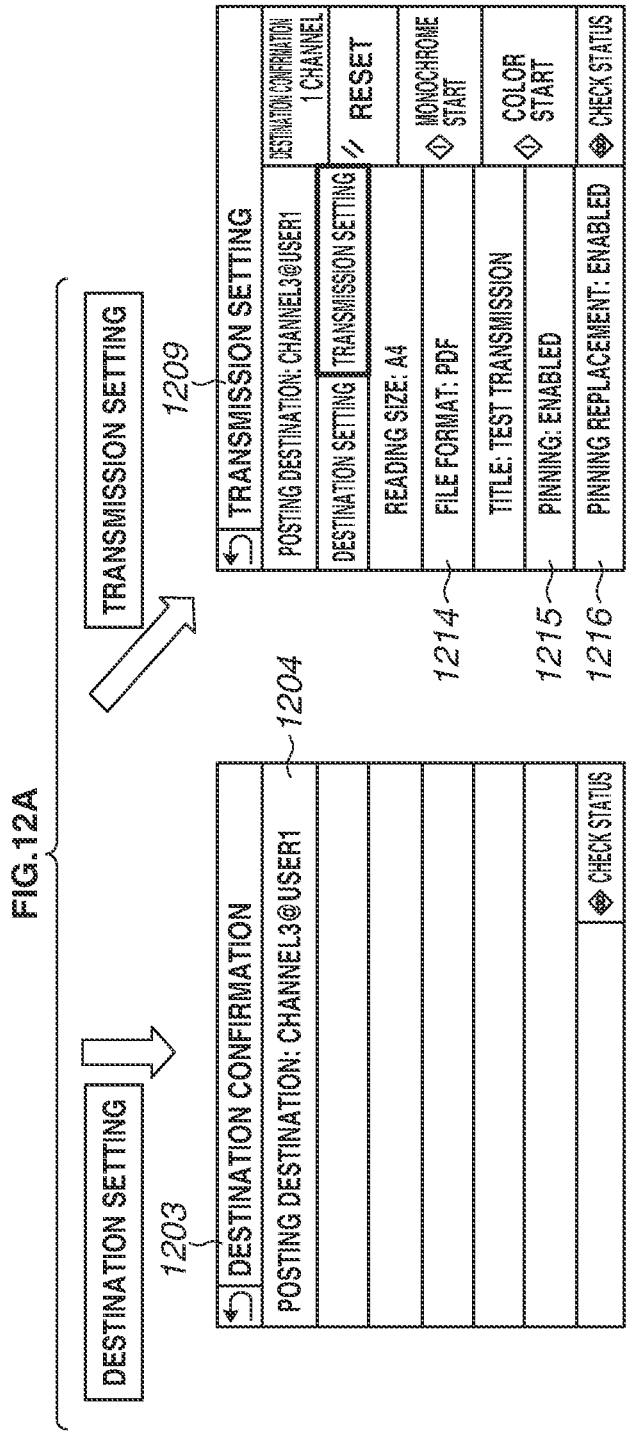

SCANNING APPARATUS, METHOD, AND STORAGE MEDIUM

BACKGROUND OF THE DISCLOSURE

Field of the Disclosure

The present disclosure relates to a scanning apparatus, an image processing method, and a storage medium.

Description of the Related Art

Japanese Patent Application Laid-Open No. 2021-078084 discusses an image processing apparatus that transmits image data generated by scanning an image on a document to a message application server that provides a chat service. The image data is thereby uploaded to and shared on a channel of the chat service.

For example, if messages are exchanged after image data is uploaded to a channel (a talk room), the image data uploaded from the image processing apparatus is swept out of a screen by the messages. Thus, there is a possibility that a user who participates in the channel may not notice that the image data has been uploaded.

SUMMARY OF THE DISCLOSURE

The present disclosure is directed to making it easier for a user to check the image data when image data generated by a scanning apparatus scanning a document is uploaded to a chat service.

According to an aspect of the present disclosure, a scanning apparatus includes a scanning unit configured to scan a document to generate image data, and a transmission unit configured to transmit to a chat server the image data generated by the scanning unit and a request to display information indicating that the image data is posted at a predetermined position on a screen in a talk room even if a message is posted to the talk room after the image data is posted to the talk room. The image data transmitted by the transmission unit is posted to the talk room, and the information indicating that the image data is posted is displayed at the predetermined position on the screen in the talk room.

Further features of the present disclosure will become apparent from the following description of exemplary embodiments with reference to the attached drawings.

DESCRIPTION OF THE EMBODIMENTS

Exemplary embodiments according to the present disclosure will be described below with reference to the attached drawings. Configurations described in the following exemplary embodiments are merely examples, and the present disclosure is not limited to the illustrated configurations.

An image processing apparatus is described as an exemplary embodiment of an information processing apparatus according to the present disclosure.

Figure 1:
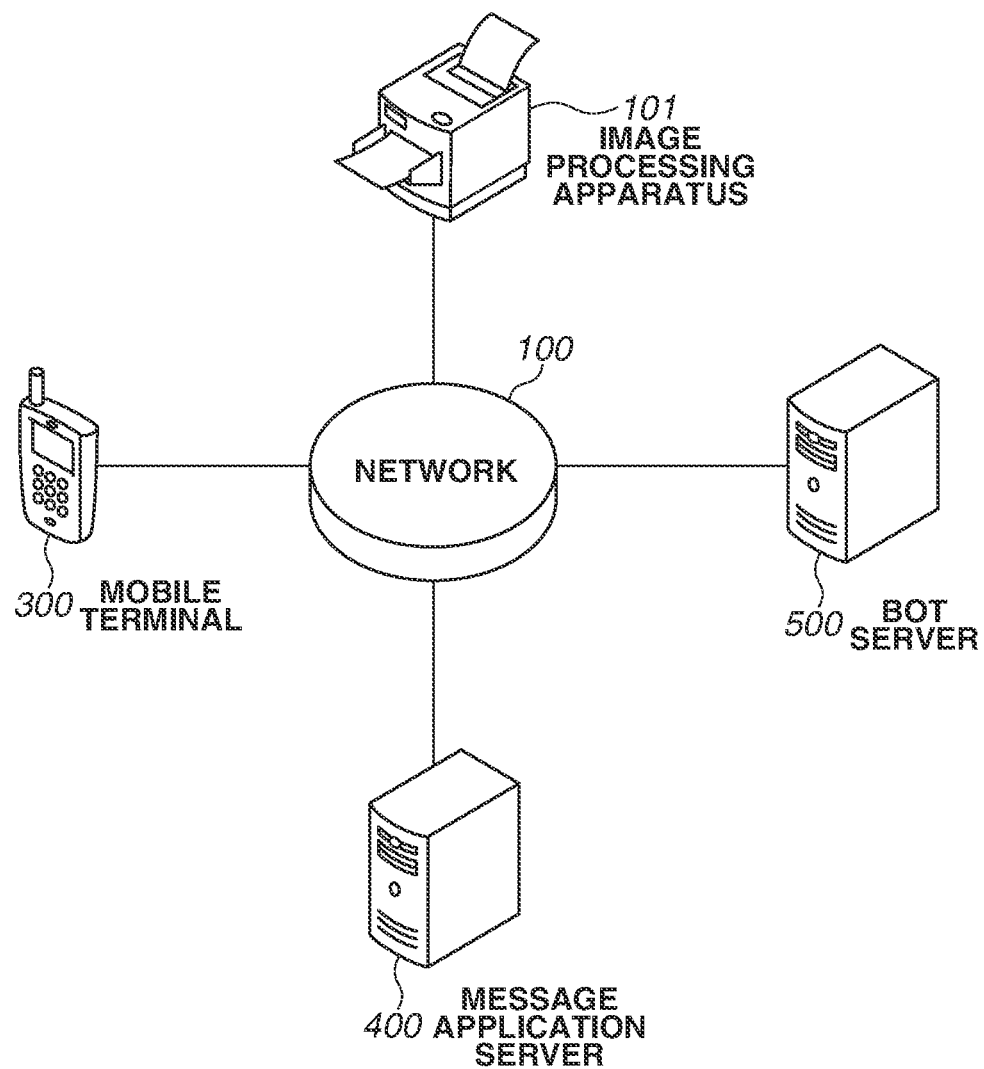
FIG. 1 illustrates an example of a system configuration according to the present disclosure.

FIG. 1 illustrates an example of a system configuration according to the present disclosure. The system configuration according to a first exemplary embodiment includes a mobile terminal 300 as an example of a terminal device, an image processing apparatus 101, and a message application server 400, which can communicate with each other via a network 100. A bot server 500 is also connected in a communicable manner via the network 100. The message application server 400 is a chat server that receives a message and image data transmitted from the image processing apparatus 101 or the mobile terminal 300, and manages and provides a chat service to be displayed on the mobile terminal 300 or a personal computer (PC) (not illustrated) by a user operation. The bot server 500 associates a bot application installed on the message application server 400 connected to the image processing apparatus 101 with information (token information) corresponding to the bot application, and transfers a request from the image processing apparatus 101 to the message application server 400. The network 100 according to the present exemplary embodiment can be the Internet or a local area network (LAN). The network 100 can be wired or wireless.

Figure 2:
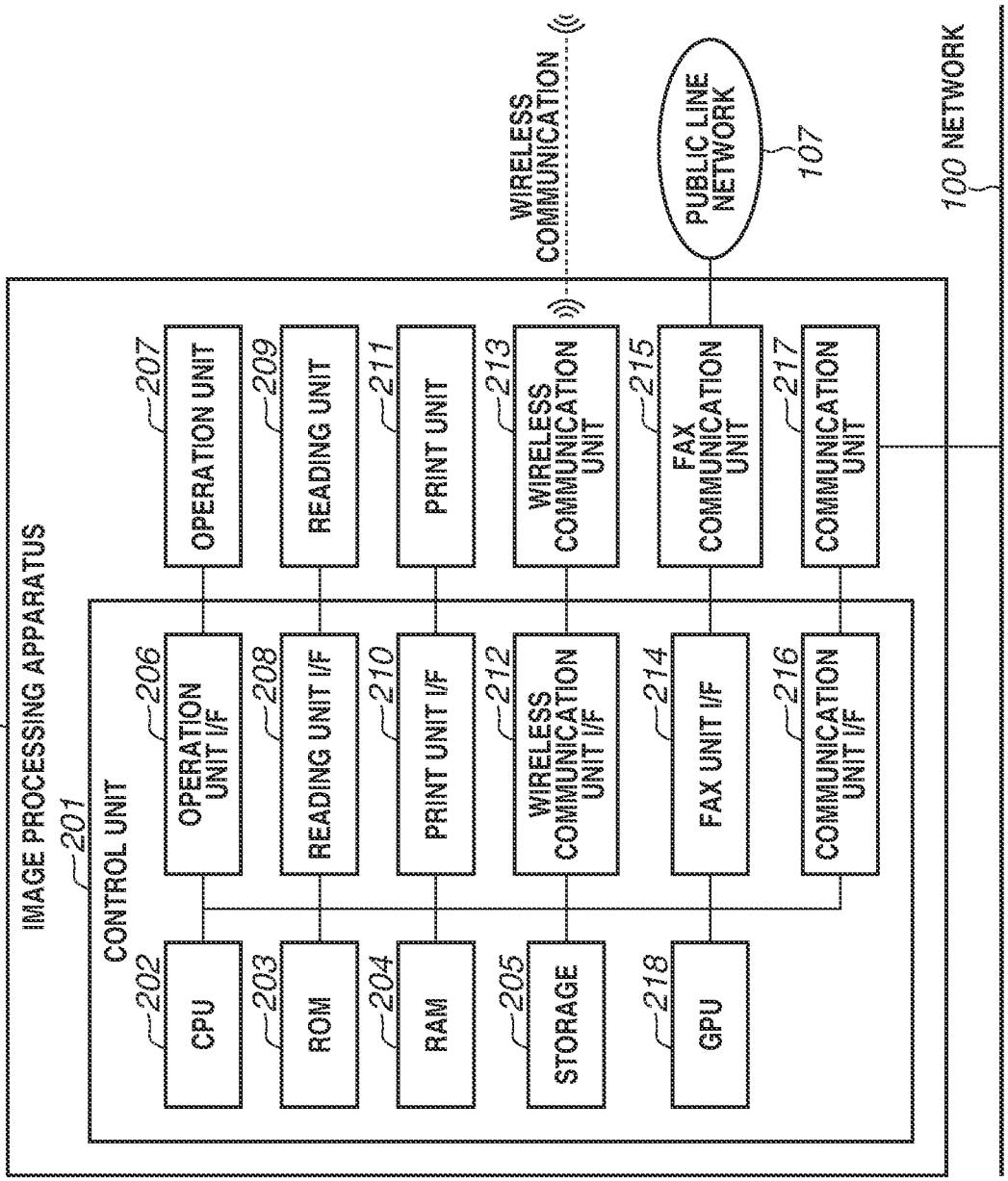
FIG. 2 illustrates an example of a hardware configuration of an image processing apparatus.

FIG. 2 is a block diagram illustrating an example of a hardware configuration of the image processing apparatus 101.

According to the present exemplary embodiment, a multifunction peripheral having a print function, a scanner function, a data communication function, and the like is described as an example.

The image processing apparatus 101 can be a scanning apparatus.

The image processing apparatus 101 includes a central processing unit (CPU) 202, a read-only memory (ROM) 203, a random access memory (RAM) 204, a storage 205, an operation unit interface (I/F) 206, an operation unit 207, a reading unit OF 208, a reading unit 209, a print unit OF 210, a print unit 211, a wireless communication unit OF 212, and a wireless communication unit 213. The image processing apparatus 101 further includes a facsimile (FAX) unit OF 214, a FAX communication unit 215, a communication unit OF 216, communication unit 217, and a graphics processing unit (GPU) 218.

A control unit 201 including the CPU 202 controls an entire operation of the image processing apparatus 101. The CPU 202 reads a control program stored in the ROM 203 or the storage 205 to the RAM 204, and performs various types of control, such as reading control and printing control. The ROM 203 stores a control program that can be executed by the CPU 202. The ROM 203 also stores a boot program, font data, and the like. The RAM 204 is a main memory to be used as a work area or a temporary storage area for developing various control programs stored in the ROM 203 and the storage 205. The storage 205 stores image data, print data, various programs, and various types of setting information. According to the present exemplary embodiment, a flash memory is assumed as the storage 205, but auxiliary storage devices, such as a solid state drive (SSD) and a hard disc drive (HDD), can also be used. An embedded multimedia card (eMMC) can also be used.

In the image processing apparatus 101 according to the present exemplary embodiment, one CPU 202 uses one memory (the RAM 204) to execute each processing illustrated in flowcharts described below. However, the present disclosure is not limited to this configuration. For example, a plurality of CPUs, RAMs, ROMs, and storages can also cooperate to execute each processing illustrated in the flowcharts described below. A part of the processing can be executed using a hardware circuit, such as an application specific integrated circuit (ASIC) and a field programmable gate array (FPGA).

The operation unit I/F 206 connects the operation unit 207 including a display unit, such as a touch panel and hard keys, to the control unit 201, for example. The operation unit 207 displays information to a user or detects an input from the user.

The reading unit I/F 208 connects, for example, the reading unit 209, such as a scanner, to the control unit 201. The reading unit 209 reads an image on a document, and the CPU 202 converts the image into image data, such as binary data. The image data generated based on the image read by the reading unit 209 is transmitted to an external apparatus or printed on a recording sheet. The reading unit 209 included in a scanning unit can scan a plurality of sheets of a document placed on an automatic document feeder (ADF) (not illustrated) and generate a plurality of image data. At this time, the document placed on the ADF is conveyed by the ADF and scanned.

The print unit I/F 210 connects, for example, the print unit 211, such as a printer, to the control unit 201. The CPU 202 transfers image data (print data) stored in the RAM 204 to the print unit 211 via the print unit I/F 210. The print unit 211 prints an image based on the transferred image data on a recording sheet fed from a sheet feeding cassette. The wireless communication unit I/F 212 is an I/F for controlling the wireless communication unit 213. The wireless communication unit OF 212 connects the control unit 201 and an external wireless device (here, the mobile terminal 300) via wireless.

The control unit 201 is connected to a public line network 107 by the FAX unit OF 214 controlling the FAX communication unit 215, such as a facsimile machine. The FAX unit OF 214 is an OF for controlling the FAX communication unit 215. The FAX unit OF 214 can connect to the public line network 107 and control a facsimile communication protocol by controlling a modem for facsimile communication and a network control unit (NCU).

The communication unit OF 216 connects the control unit 201 to the network 100. By using the communication unit OF 216, the communication unit 217 transmits image data and various types of information in the image processing apparatus 101 to the external apparatus on the network 100, and receives print data from an information processing apparatus on the network 100 or information on the network 100. As a method of transmission and reception via the network 100, transmission and reception can be performed using an e-mail, and file transmission using other protocols (e.g., a file transfer protocol (FTP), a Server Message Block (SMB), and Web-based distributed authoring and versioning (WEBDAV)). It is also possible to transmit or receive image data and various setting data via the network 100 by access using Hypertext Transfer Protocol (HTTP) communication from the mobile terminal 300, the message application server 400, and the bot server 500.

Figure 3:
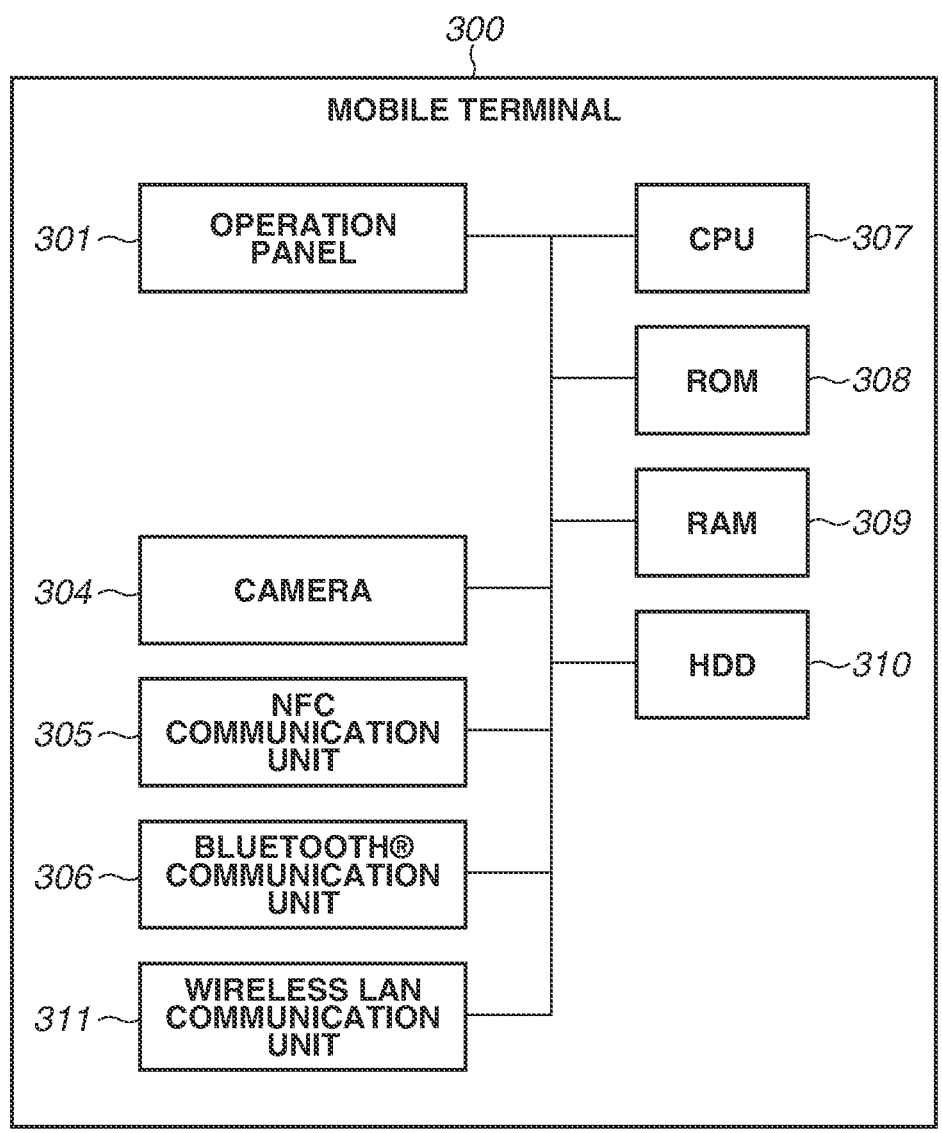
FIG. 3 illustrates an example of a hardware configuration of a mobile terminal.

FIG. 3 illustrates an example of a hardware configuration of the mobile terminal 300. The mobile terminal 300 according to the present exemplary embodiment is assumed to be a device, such as a smart phone or a tablet PC, but can be another device as long as the device is an information processing apparatus capable of performing Wireless Fidelity (Wi-Fi) communication.

A CPU 307 reads a control program stored in a ROM 308 to execute various types of processing to control an operation of the mobile terminal 300. The ROM 308 stores a control program. A RAM 309 is a main memory of the CPU 307 and a temporary storage area, such as a work area. An HDD 310 stores various data, such as a picture and an electronic document.

An operation panel 301 has a touch panel function for detecting a touch operation by a user and displays various screens provided by an operating system (OS) and an e-mail transmission application. The operation panel 301 is also used to check information stored in the message application server 400. A user can input any operation instruction to the mobile terminal 300 by inputting a touch operation to the operation panel 301. The mobile terminal 300 is equipped with hardware keys (not illustrated), and the user can use the hardware keys to input an operation instruction to the mobile terminal 300.

A camera 304 captures an image in response to an imaging instruction from a user. The image captured by the camera 304 is stored in a predetermined area in the HDD 310. It is also possible to acquire information from a quick response (QR) Code® read by the camera 304 using a program for analyzing the QR Code®.

The mobile terminal 300 can exchange data with various peripheral devices via a near field communication (NFC) communication unit 305, a Bluetooth® communication unit 306, or a wireless LAN communication unit 311. The Bluetooth® communication unit 306 of the mobile terminal 300 can support Bluetooth® Low Energy.

Figure 4:
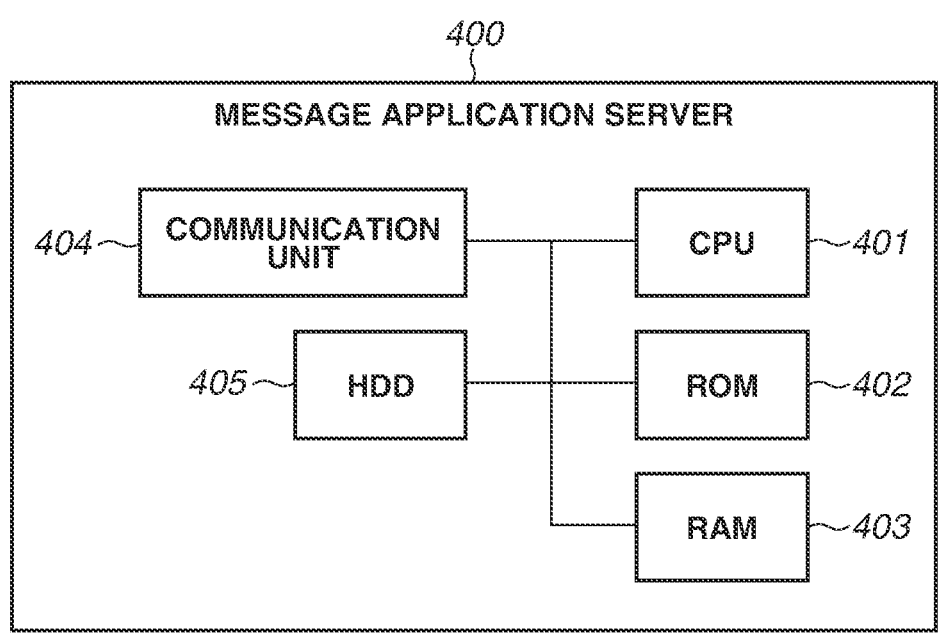
FIG. 4 illustrates an example of a hardware configuration of a message application server.

FIG. 4 illustrates an example of a hardware configuration of the message application server 400. A CPU 401 reads a control program stored in a ROM 402 and executes various types of processing to control an operation of the message application server 400. The ROM 402 stores a control program. A RAM 403 is used as a main memory of the CPU 401 and a temporary storage area, such as a work area. An HDD 405 stores various data, such as a message, image data, and channel information. The message application server 400 can transmit and receive data to and from various devices, such as the mobile terminal 300, the image processing apparatus 101, and the bot server 500, via a communication unit 404. The communication unit 404 can perform wired communication using Ethernet® or can perform wireless communication, such as Wi-Fi.

Figure 5:
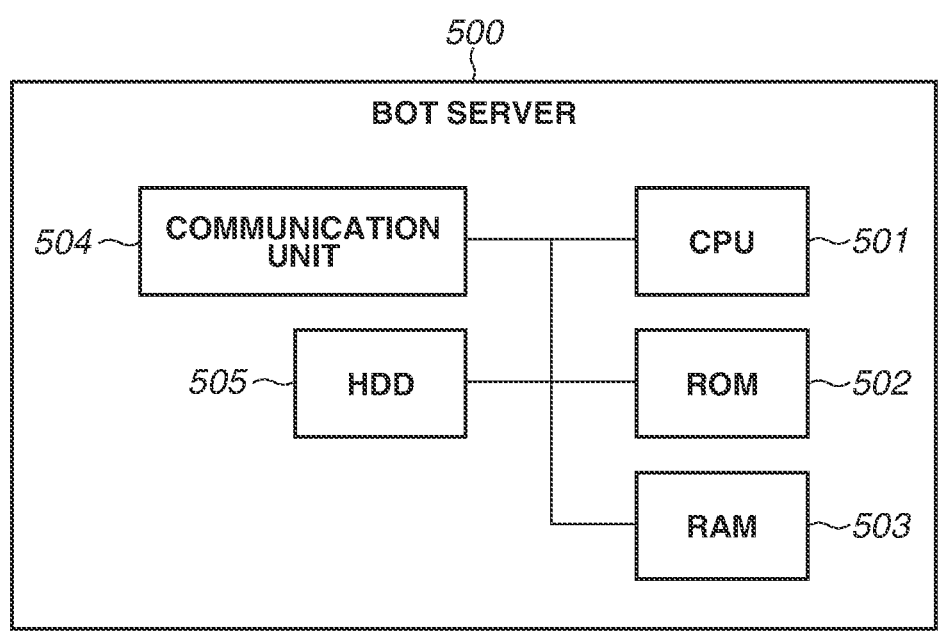
FIG. 5 illustrates an example of a hardware configuration of a bot server.

FIG. 5 illustrates an example of a hardware configuration of the bot server 500. A CPU 501 reads a control program stored in a ROM 502 to control an operation of the bot server 500 and executes various processing to mediate with the message application server 400 in response to a request from the image processing apparatus 101. The ROM 502 stores a control program. A RAM 503 is used as a main memory of the CPU 501 and a temporary storage area, such as a work area. An HDD 505 stores various data such as a message, image data, and channel information. The bot server 500 can transmit and receive data to and from various devices, such as the mobile terminal 300, the image processing apparatus 101, and the message application server 400, via a communication unit 504.

Figure 6:
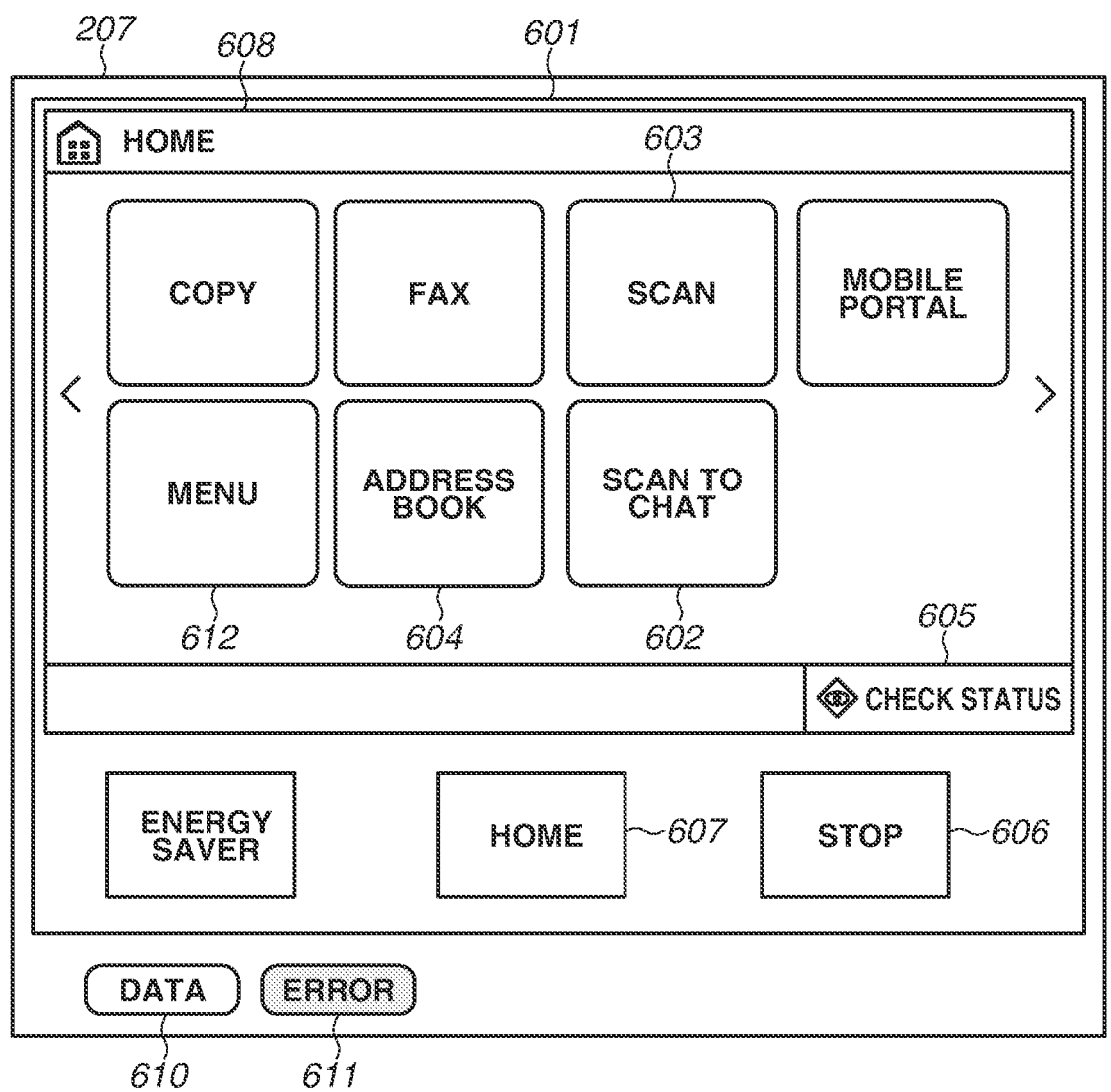
FIG. 6 illustrates an example of a home screen displayed on an operation unit of the image processing apparatus.

FIG. 6 illustrates an example of a home screen displayed on the operation unit 207 of the image processing apparatus 101. The operation unit 207 includes a touch panel 601 for displaying an operation screen and light emitting diodes (LEDs) 610 and 611. The touch panel 601 is an instruction unit that also functions as an acceptance unit to accept an instruction from a user and a display unit to display a screen. A user directly touches a screen displayed on the touch panel 601 with an object, such as a finger or a stylus, and instructs execution of each function based on the displayed screen.

The touch panel 601 illustrated in FIG. 6 displays a home screen 608. The home screen 608 is a first screen for instructing the execution of each function of the image processing apparatus 101. The home screen 608 is a screen for selecting screen display for performing various settings for each function, such as copy, fax, scan, and media print, executed by the image processing apparatus 101.

A status check button 605 is an object for displaying a screen (a status check screen) for checking a status of the image processing apparatus 101. A transmission history and a job execution history can be displayed from the status check screen (not illustrated).

Figures 12A, 12B:
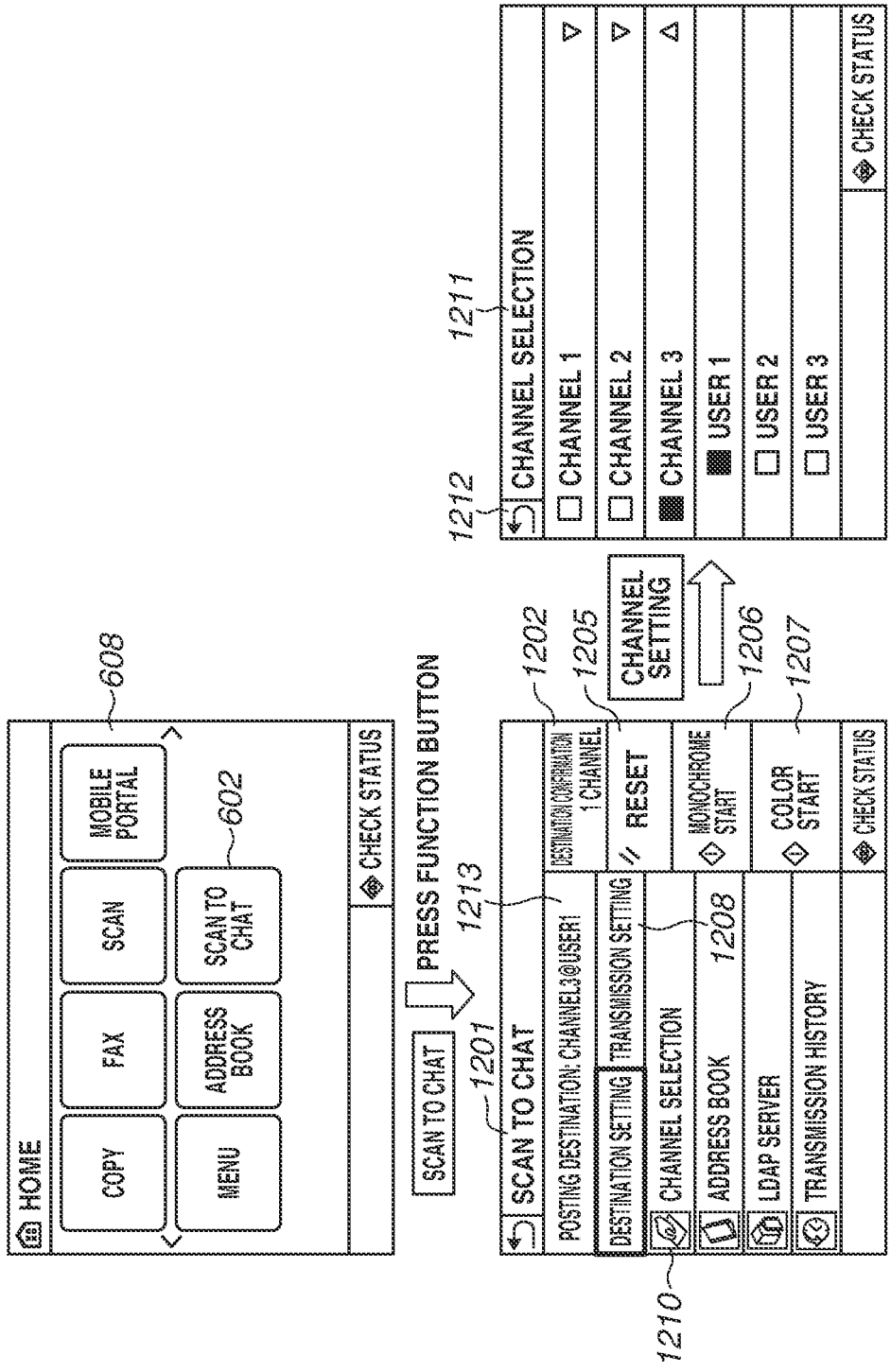
FIGS. 12A and 12B illustrate an example of screen transition in scan-to-chat processing.

A scan-to-chat button 602 is an object for displaying a setting screen for scan-to-chat processing. If a user selects the scan-to-chat button 602, a scan-to-chat screen 1201 illustrated in FIG. 12A is displayed on the operation unit 207. The scan-to-chat processing will be described in detail below with reference to FIGS. 7 and 8.

A scan button 603 is an object for displaying a scan selection screen (not illustrated) from the image processing apparatus 101. The scan selection screen is a screen for selecting a transmission function, such as e-mail transmission (E-mail), file transmission using SMB, FTP, or HTTP, and Internet fax (I-fax) transmission. When a user touches the object indicating the displayed transmission function, the scan selection screen displays a setting screen for each transmission function.

An address book button 604 is an object for displaying an address book screen of the image processing apparatus 101 by being selected by a user. The LEDs 610 and 611 notify the user of the state of the image processing apparatus 101. The LED 610 lights up at the time of receiving an e-mail or executing a print job. The LED 611 lights up if some error occurs in the image processing apparatus 101. A stop button 606 is an object for canceling various operations. The stop button 606 is always displayed on the operation unit 207. A home button 607 is an object for displaying the home screen 608. The home button 607 is always displayed on the operation unit 207. A menu button 612 is an object for displaying a screen for setting an environment, such as a language to be used, and setting each function.

Figure 7:
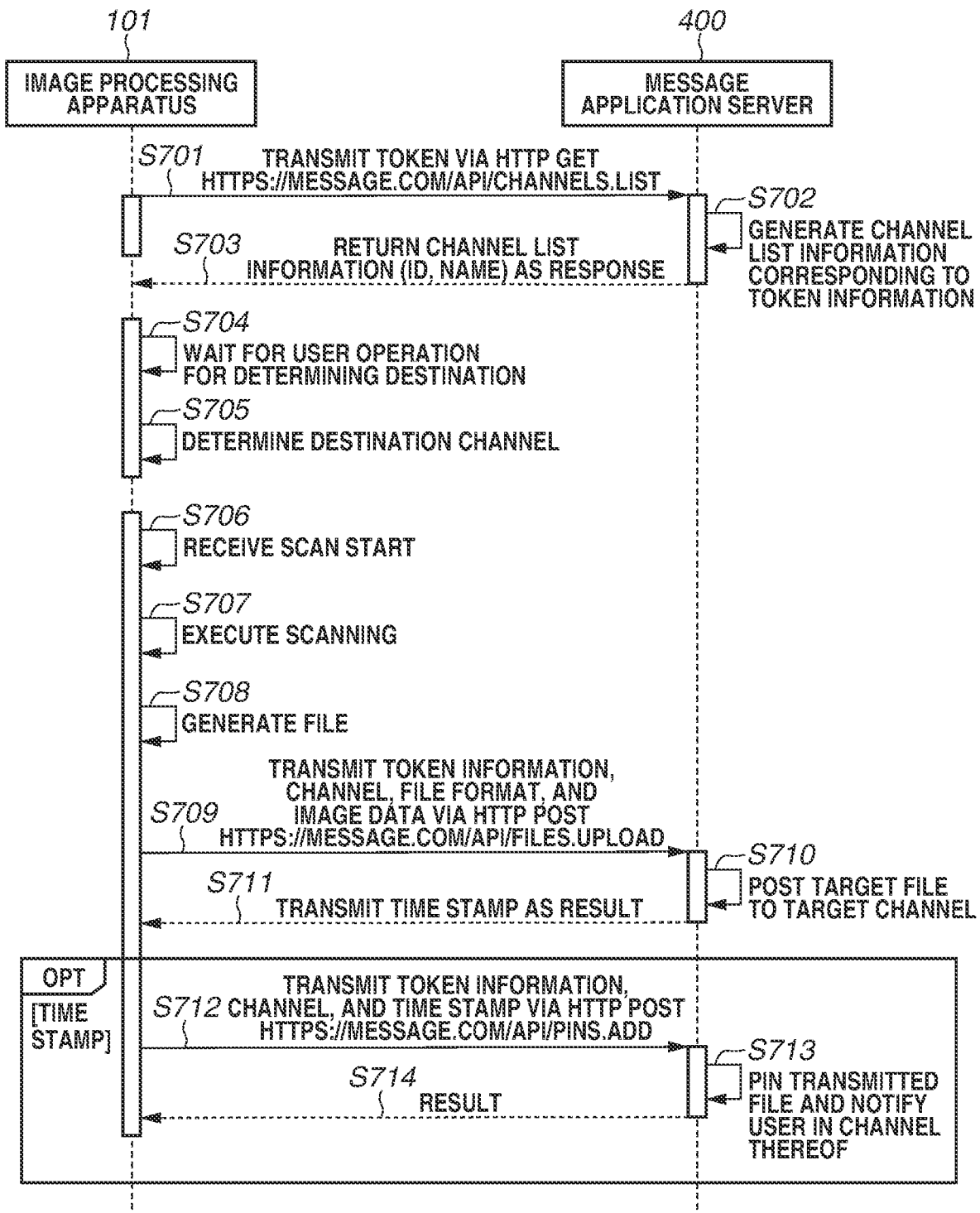
FIG. 7 illustrates an example of a sequence in which the image processing apparatus transmits a file generated by scanning to the message application server.

FIG. 7 illustrates an example of a sequence in which the image processing apparatus 101 transmits a file generated by scanning to the message application server 400. The sequence in FIG. 7 is started if a channel selection button 1210 on the scan-to-chat screen 1201 in FIG. 12A is selected.

In step S701, the CPU 202 of the image processing apparatus 101 controls the communication unit 217 to request channel list information from the message application server 400 through HTTP communication. Specifically, the CPU 202 transmits to the message application server 400 the token information input by the image processing apparatus 101 and information indicating a request for a channel list in a work space indicated by the token information. An example of a command transmitted here is "HTTP GET https://message.com/api/channels.list". A Uniform Resource Locator (URL) "https://message.com/api/channels.list" described in this command is a URL for accessing the message application server 400. If the token information is transmitted to the URL, the message application server 400 searches for the work space and the bot application corresponding to the token information. The token information is input by a user via a setting registration screen 1301 illustrated in FIG. 13 displayed on the operation unit 207 of the image processing apparatus 101.

The work space is like an organization to which a plurality of users belongs within a message application. The channel is like a chat room within the work space. The chat room described here is a mechanism for a plurality of users participating in the chat room to transmit and receive a message to and from each other and interact like a conversation. According to the present exemplary embodiment, the channel is described as a chat room, but it is not limited to the chat room as long as the channel has a mechanism for a plurality of users to transmit and receive a message and interact like a conversation. For example, the mechanism can be something like a group chat, a room, a talk room, or a group.

The bot application here is an application for registering the image processing apparatus 101 as a user in a message application and posting a message or image data. The bot application is installed on the message application server 400. If the image processing apparatus 101 specifies the bot application and transmits image data to the message application server 400, the bot application posts the transmitted image data in the message application. In the HDD 405 of the message application server 400, the bot application and the token are associated with each other and stored, and the bot application is also associated with the work space. Thus, the message application server 400 receives the token information from the image processing apparatus 101, and thereby the message application server 400 can return information about the work space associated with the bot application associated with the token information. The token information, the bot application, and the work space can also be directly associated with each other. The work space corresponding to the token information registered in advance (the work space to which the user transmits image data) can thereby be selected from a large number of work spaces.

In step S702, the CPU 401 of the message application server 400 checks whether access to the URL is permitted based on the token information received from the image processing apparatus 101 via the communication unit 404. If the access is permitted, the CPU 401 generates the channel list information included in the work space corresponding to the token information. The channel list information is sequence information indicating channel information. The channel information includes a channel identification (ID), a channel name, information indicating a user participating in the channel, and a channel setting value indicating a setting whether the channel is an archive channel.

In step S703, the CPU 401 of the message application server 400 controls the communication unit 404 to transmit the channel list information to the image processing apparatus 101 as response information in HTTP communication.

In step S704, the CPU 202 of the image processing apparatus 101 generates a channel selection screen 1211 based on the channel information included in the received channel list information. If the user selects the channel selection button 1210, the CPU 202 of the image processing apparatus 101 displays the channel selection screen 1211 on the touch panel 601 of the operation unit 207 and waits for an operation by the user. The channel selection screen 1211 will be described below with reference to FIG. 12A.

In step S705, if at least a channel is selected on the channel selection screen 1211 and a return button 1212 is selected, the CPU 202 of the image processing apparatus 101 determines information about a posting destination channel.

In step S706, the CPU 202 of the image processing apparatus 101 receives a scan execution instruction via the operation unit 207.

In step S707, the CPU 202 of the image processing apparatus 101 executes scanning based on a scan setting at the time of receiving the scan execution instruction.

In step S708, the CPU 202 of the image processing apparatus 101 generates image data in a format set in the scan setting from the scanned image. As for the scan setting, a scan setting specified by the user on a detail setting screen for scan-to-chat processing (not illustrated) is used. The scan setting can be displayed and set together with a transmission setting on a transmission setting screen 1209 in FIG. 12B.

In step S709, the CPU 202 transmits the same token information as in step S701, the information about the posting destination channel selected in step S705, a file format, and the image data generated in step S708 to the message application server 400 via the communication unit 217 through HTTP communication. As for the file format, a file format specified by the user on the transmission setting screen 1209 for scan-to-chat processing is used. On the transmission setting screen 1209, the user can set with a button 1215 whether to enable or disable pinning of the image data to be posted. In a case where pinning replacement is set to enable, if there is already a pinned post in the selected channel, pinning of the post can be released and a post of the image data to be transmitted from now can be pinned. In a case where the pinning replacement is set to disable, if there is already a pinned post in the selected channel, the pinned post will not be replaced by a new post. In other words, a post of the image data to be transmitted from now will not be pinned. A plurality of posts can also be pinned in a case where there is already a pinned post.

In step S710, the CPU 401 of the message application server 400 searches for work space information and application information registered in the token information received in step S709, and stores the work space information and the application information by associating with the received image data and the channel specified in the channel information. In a case where a user of a posting destination is specified, the CPU 401 further associates the received image data and the channel with the user of the posting destination and stores them. Accordingly, if the user launches the message application on the mobile terminal 300 and specifies the channel to check a content of a previous conversation in the channel, a screen on which the received image data has been posted is displayed.

In step S711, the CPU 401 of the message application server 400 transmits, to the image processing apparatus 101, a result corresponding to whether the posting is successful and, if successful, a time stamp that can uniquely identify the posted image data as response information in HTTP communication. Here, the time stamp is added to the response information as a response in the case of success, but any information, such as a message ID, can be used as long as it is information that can uniquely identify the posted image data as a message. In a case where the posting is successful, the CPU 202 of the image processing apparatus 101 can display a notification to the effect that the posting has been successful on the operation unit 207. In a case where the posting fails, the CPU 202 of the image processing apparatus 101 can display a notification to the effect that the posting has failed on the operation unit 207. In a case where the posting is successful, no notification is displayed, and only in a case where the posting fails, a notification to the effect that the posting has failed can be displayed.

In a case where the response information includes the time stamp that can uniquely identify the posted image data and is received by the image processing apparatus 101 from the message application server 400 in step S711 in a case where the posting is successful, processing in steps S712 to S714 is performed.

In step S712, the CPU 202 of the image processing apparatus 101 transmits, to the message application server 400 via the communication unit 217, the same token information as in step S701, the information about the posting destination channel selected in step S705, and the time stamp information received in step S711. The CPU 202 also transmits a pinning request for notifying the user in the channel of the posted image data through HTTP communication. In here, pinning is a function of fixing, within a channel, information indicating that a specific post has been made at a predetermined position, such as an upper part of a screen of the channel. The pinning is a function of keeping the specific post displayed at the predetermined position even if a message is posted after the specific post is made. Instead of displaying the specific post at the fixed position such as the upper part of the screen of the channel, a notification method can be used in which the pinned message is confirmed from a pinned message list on the menu screen by changing background color of a message or adding an icon or a comment indicating that the message is pinned.

A function can also be provided to move to a pinned post displayed on a timeline in response to selection of the pinned post. In other words, an object corresponding to information indicating that the image data has been posted is selected in a state in which the posted image data is not displayed in the talk room, and thus the posted image data is displayed in the talk room. A specific example will be described in FIGS. 14A and 14B. According to the present exemplary embodiment, a method for notifying a user in the channel of a message is referred to as pinning, but the method can also be referred to as, for example, an announcement function without being limited to pinning.

In step S713, the CPU 401 of the message application server 400 identifies the post including image data from the time stamp information received in step S712, and enables the pinning function to the post. In other words, image data generated by scanning is posted to the talk room, and information indicating that the image data has been posted is displayed at a predetermined position on a screen in the talk room. If the user launches the message application on the mobile terminal 300 and specifies the channel to check the content of the previous conversation in the channel, the posted image data received in step S709 is thereby displayed on the screen in the pinned state.

In step S714, the CPU 401 of the message application server 400 transmits a result corresponding to whether the pinning has been successful to the image processing apparatus 101 as the response information in HTTP communication. In a case where the pinning has been successful, the CPU 202 of the image processing apparatus 101 can display a notification to the effect that the pinning has been successful on the operation unit 207. In a case where the pinning has failed, the CPU 202 of the image processing apparatus 101 can display a notification to the effect that the pinning has failed on the operation unit 207. In a case where the pinning has been successful, no notification is displayed, and only in a case where the pinning has failed, a notification to the effect that the pinning has failed can be displayed.

In the present exemplary embodiment, the processing in steps S712 to S714 can be performed in a case where the user enables pinning using the button 1215 illustrated in FIG. 12B.

Figure 8A:
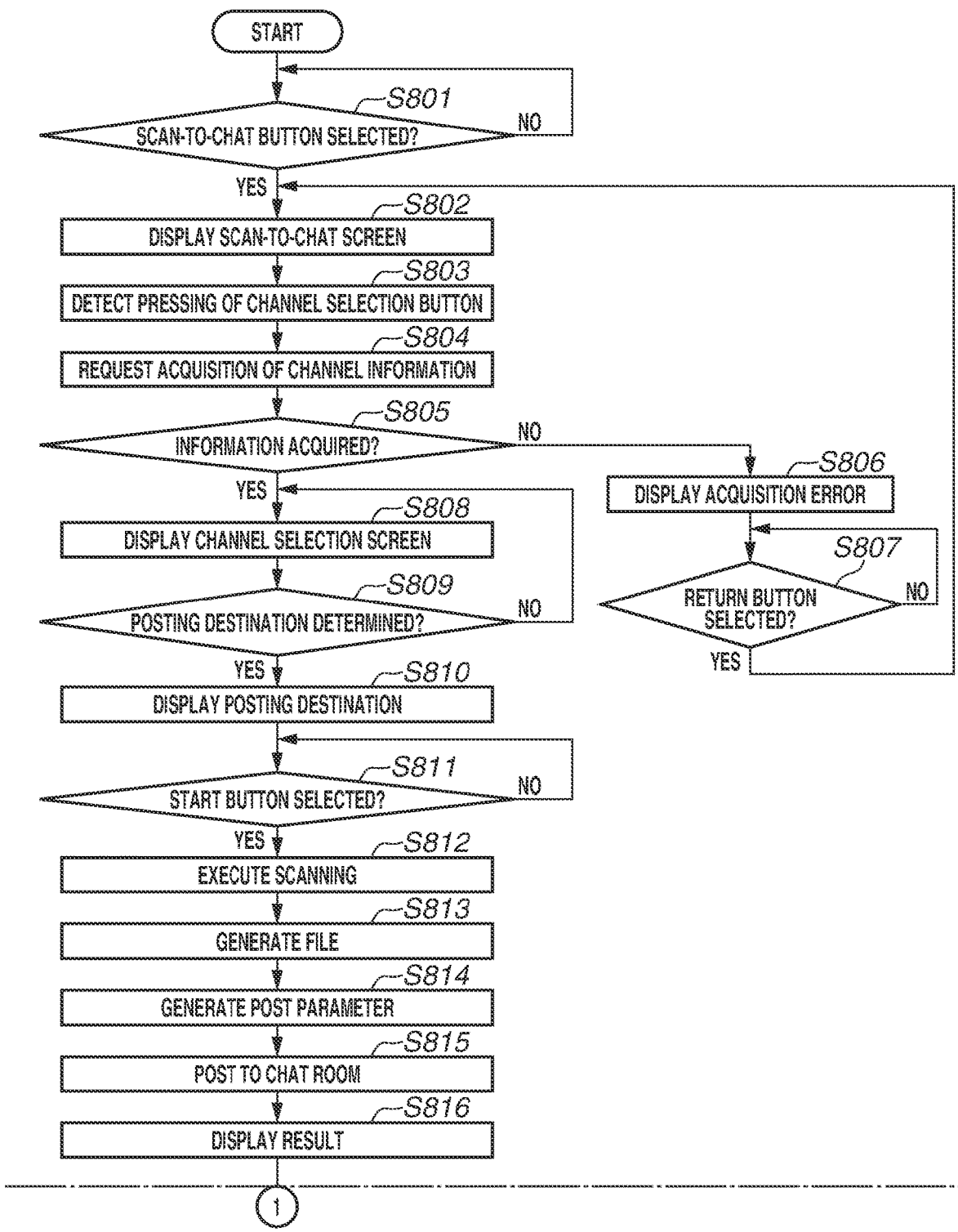
FIGS. 8A and 8B illustrate a flowchart for an example of scan-to-chat processing.
Figure 8B:
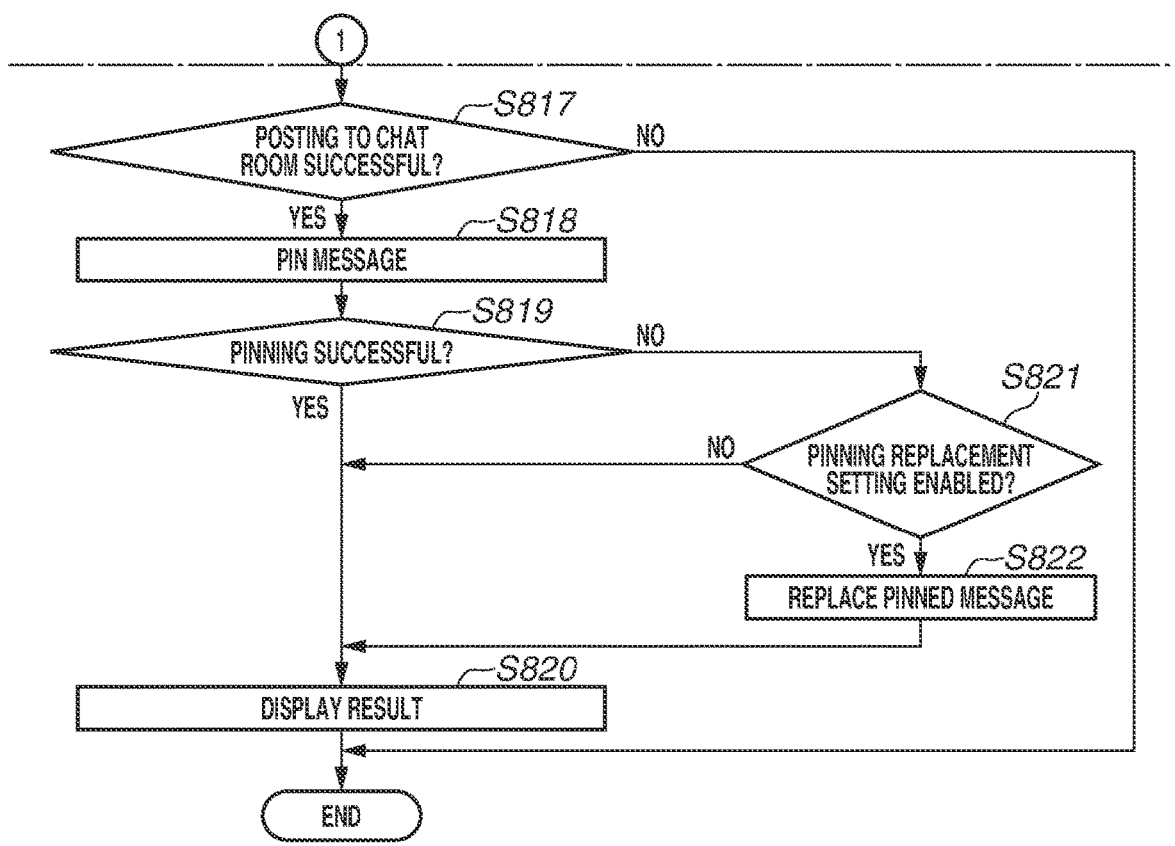

FIGS. 8A and 8B illustrates a flowchart for an example of scan-to-chat processing. Processing in the flowchart in FIGS. 8A and 8B is started if power supply of the image processing apparatus 101 is turned on.

In step S801, the CPU 202 determines whether the scan-to-chat button 602 is selected. In a case where it is determined that the button is selected (YES in step S801), the processing proceeds to step S802. Otherwise (NO in step S801), the processing returns to step S801.

In step S802, the CPU 202 displays the scan-to-chat screen 1201 on the touch panel 601 of the operation unit 207. Here, screen transition in a case where the scan-to-chat button 602 is selected will now be described with reference to FIGS. 12A and 12B.

FIGS. 12A and 12B illustrate an example of the screen transition in scan-to-chat processing. If the scan-to-chat button 602 displayed on the home screen 608 is selected, the scan-to-chat screen 1201 is displayed on the touch panel 601 of the operation unit 207.

A destination confirmation button 1202 is displayed on the scan-to-chat screen 1201.

The destination confirmation button 1202 displays the number of destinations set as the posting destinations of the image data generated by scanning. The example in which one channel, which is the posting destination, is selected is described in FIGS. 12A and 12B. In a case where a plurality of destinations is selected, the number of the set posting destinations is displayed as the number of destinations.

If the destination confirmation button 1202 is selected, a scan-to-chat destination confirmation screen 1203 is displayed. The scan-to-chat destination confirmation screen 1203 displays a transmission setting posting destination, which is set by selecting the channel selection button 1210. A posting destination button 1204 displays the posting destination set at that time. If the user selects the posting destination button 1204, the scan-to-chat destination confirmation screen 1203 that displays the set posting destination (destination) is displayed. If the posting destination button 1204 is set, a detail screen (not illustrated) is displayed, and the details of the set posting destination is displayed.

In the present exemplary embodiment, only one posting destination is displayed on the scan-to-chat destination confirmation screen 1203, but the present disclosure is not limited to this configuration. For example, the image processing apparatus 101 sets a plurality of posting destinations from the message application server 400, so that a plurality of posting destination buttons can be displayed on the scan-to-chat destination confirmation screen 1203.

In a case where a reset 1205 is selected on the scan-to-chat screen 1201, the set information is cleared. At this time, the set destination information is cleared. In a case where a monochrome start button 1206 or a color start button 1207 is selected on the scan-to-chat screen 1201, processing for scanning and transmitting is started.

If a transmission setting button 1208 is selected, the transmission setting screen 1209 is displayed. On this screen, the transmission setting, such as a file format 1214, can be changed and confirmed. The button 1215 can be used to set whether to enable or disable pinning. A button 1216 can be selected only in a case where pinning is enabled and cannot be selected in a case where the pinning is set to be disabled with the button 1215.

If the channel selection button 1210 is selected, the channel selection screen 1211 is displayed. The channel and the user displayed on the channel selection screen 1211 are displayed based on the channel list information received by the image processing apparatus 101 from the message application server 400. On this screen, the posting destination channel and which user belonging to the channel to notify can be selected. In other words, it is possible to select the channel to post and who to mention. If a channel button is selected, a user belonging to the channel is displayed in a pull-down menu. On this screen, both of the channel and the user can be selected, or only the channel can be selected to post to all users belonging to the channel. A plurality of channels can also be selected, or one channel can be selected and a plurality of users in the channel can be selected. Furthermore, a plurality of channels can be selected, and different users belonging to the respective channels can also be selected.

If a return button 1212 is selected, a channel selection content is retained, and the scan-to-chat screen 1201 is displayed again. At this time, a name of the selected channel, which is the posting destination, and a name of a user to be notified "posting destination: channel3@user1" are displayed in a posting destination column 1213. The CPU 202 of the image processing apparatus 101 also stores the posting destination based on the channel and the user set at this time to the RAM 204 or the storage 205.

The description is returned to the flow in FIGS. 8A and 8B. In step S802, the CPU 202 displays the scan-to-chat screen 1201 illustrated in FIG. 12A on the operation unit 207. In step S803, the CPU 202 detects that the channel selection button 1210 is selected.

In step S804, in response to the selection of the channel selection button 1210, the CPU 202 uses the token information 1303 registered in advance to execute processing for transmitting information indicating that the channel information is requested through HTTP communication to the message application server 400.

Figure 13:
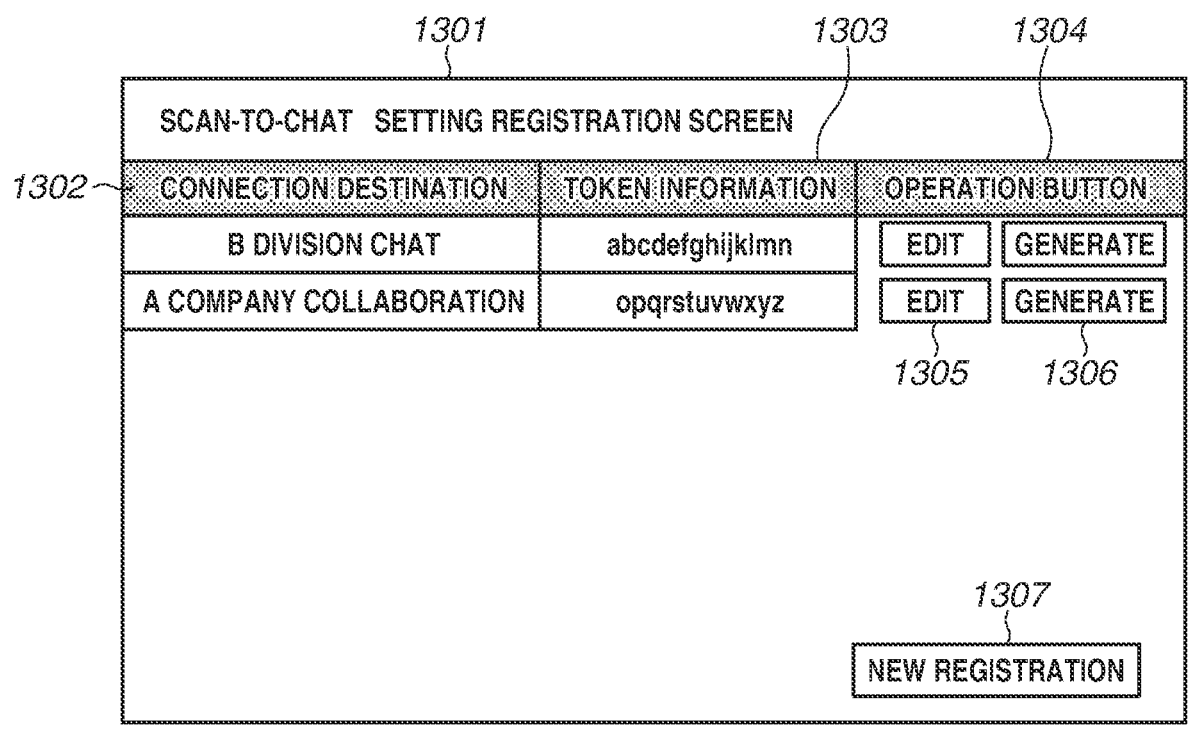
FIG. 13 illustrates an example of a setting registration screen.

The setting registration screen 1301 in FIG. 13 is described. FIG. 13 illustrates an example of the setting registration screen 1301. The setting registration screen 1301 is displayed on the operation unit 207 of the image processing apparatus 101. The setting registration screen 1301 can also be displayed as a web page on an operation unit of an information processing apparatus, such as a PC, connected to the image processing apparatus 101 via the network. A content registered on the setting registration screen 1301 is stored in the storage 205 according to the first exemplary embodiment. The content registered on the setting registration screen 1301 is stored in the HDD 505 according to a second exemplary embodiment.

A connection destination 1302 is a column indicating organization information of a connection destination. The token information 1303 is a column for registered token information. An operation button 1304 is a column for an operation button. Edit buttons 1305 and generation buttons 1306 are displayed in this item.

If the edit button 1305 is selected, character strings of token information, connection destination information, and the like can be input and changed using a keyboard or the like. If the generation button 1306 is selected, the home screen 608 is set to display the scan-to-chat button 602. The content registered on the setting registration screen 1301 is stored in the storage 205 in the first exemplary embodiment.

If a new registration button 1307 is pressed, it is possible to accept an input of the character string by the user and to add and register the connection destination and the token information.

The description is returned to the flow in FIGS. 8A and 8B. In step S805, the CPU 202 determines whether the channel information is received from the message application server 400 in response to a channel acquisition request transmitted in step S804. Specifically, the CPU 202 determines that the channel list information is not received in a case where a status code in the response in HTTP communication is an error or a case where body information in the response includes a parameter indicating that the information cannot be acquired. In a case where it is determined that the channel information is received (YES in step S805), the processing proceeds to step S808. Otherwise (NO in step S805), the processing proceeds to step S806.

In step S806, the CPU 202 displays information indicating that the channel list information has not been received on the channel selection screen 1211. At this time, the channel selection screen 1211 does not display the channel or an option for a user.

In step S807, the CPU 202 determines whether the return button 1212 is selected. In a case where it is determined that the return button 1212 is selected (YES in step S807), the processing returns to step S802. Otherwise (NO in step S807), the processing returns to step S807.

In step S808, the CPU 202 displays the channel selection screen 1211 on which the channel information or the like received from the message application server 400 is displayed on the touch panel 601 of the operation unit 207.

In step S809, the CPU 202 detects whether the posting destination (the channel, or the channel and the user) selected on the channel selection screen 1211 via the touch panel 601 of the operation unit 207 is determined. In a case where the posting destination is determined (YES in step S809), the processing proceeds to step S810, and the CPU 202 updates posting channel list information. In a case where the posting destination is not determined (NO in step S809), the processing returns to step S808. A method for detecting determination is whether the return button 1212 is selected. In the case of a screen configuration in which a determination button is displayed on the screen of the operation unit 207, the same transition is performed on selection of the determination button.

In step S810, the CPU 202 displays the scan-to-chat screen 1201 in FIG. 12A on the operation unit 207 and updates a display on the posting destination column 1213 with the posting destination determined in step S809. At this time, the CPU 202 also displays information about the user to be notified together with the channel of the posting destination.

In step S811, the CPU 202 determines whether the monochrome start button 1206 or the color start button 1207 displayed on the operation unit 207 is selected. In a case where it is determined that either of these start buttons is selected (YES in step S811), the processing proceeds to step S812. Otherwise (NO in step S811), the processing returns to step S811.

In step S812, the CPU 202 controls the reading unit 209 based on the scan setting to read an image of a document and generate image data. As for the scan setting, the scan setting specified by the user on the detail setting screen for scan-to-chat processing (not illustrated) is used.

In step S813, the CPU 202 converts the image data generated in step S812 into a file format 1214 set on the transmission setting screen 1209.

In step S814, the CPU 202 generates a post parameter. The post parameter includes the channel of the posting destination, the file format, a file name, and a posted comment. The file format is set to the one corresponding to the file format 1214 set in the transmission setting. The posted comment is generated as a character string in which an at mark "@" is added to the beginning of the information about the user to be notified. For the file name, the file name specified in the transmission setting is used.

In step S815, the CPU 202 uses the token information 1303 registered in advance to transmit the file generated in step S813 and the post parameter to the message application server 400 using a POST method of HTTP communication. The CPU 202 transmits such data (the file converted from the image data and the post parameter) to the message application server 400, so that the message application server 400 performs control to post the received file to the received user in the received channel.

In step S816, the CPU 202 receives a posted result and, if successful, the time stamp information that can uniquely identify the posted file from the message application server 400, and displays the posted result on the touch panel 601 of the operation unit 207.

In step S817, the CPU 202 determines whether the file is successfully posted to the message application server 400 in step S815. In a case where it is determined as successful (YES in step S817), the processing proceeds to step S818. Otherwise (NO in step S817), the processing in the flowchart is terminated.

In step S818, the CPU 202 uses the token information 1303 registered in advance and the time stamp that can uniquely identify the posted file to transmit a pinning request for the posted file to the message application server 400. Pinning will be described below with reference to FIGS. 14A and 14B.

In step S819, the CPU 202 determines whether the pinning is successful based on result information received from the message application server 400. In a case where the pinning is successful (YES in step S819), the processing proceeds to step S820. Otherwise (NO in step S819), the processing proceeds to step S821.

In step S820, the CPU 202 receives the posted result from the message application server 400 and displays the posted result on the touch panel 601 of the operation unit 207.

In step S821, the CPU 202 determines whether pinning replacement is set to be enabled by the button 1216 on the transmission setting screen 1209 illustrated in FIG. 12B. In a case where it is determined to be enabled (YES in step S821), the processing proceeds to step S822. In a case where it is determined not to be enabled (NO in step S821), the processing proceeds to step S820.

In step S822, the CPU 202 enables a function of replacing an originally pinned message with respect to the message application server 400 using the POST method of HTTP communication and pins the message again.

According to the present exemplary embodiment, a user can easily post a file from the image processing apparatus 101 to the channel in the message application server 400 and pin the posted file. Even if pinning processing fails because a pinned message already exists, the user can replace the already pinned message.

In response to selection of the start button 1206 or 1207 by the user, the reading unit 209 scans a document and generates image data, and the communication unit 217 transmits the image data and a pinning request to the message application server 400. The user can thereby execute scanning of the document and transmission of the image data and the pinning request with a single execution instruction.

In the present exemplary embodiment, it is assumed that only one piece of token information is registered, but, in a case where a plurality of pieces of token information is registered, the processing related to the token information, such as steps S804, S815, and S818, is executed for each registered token.

The file converted from the image data and the post parameter are transmitted to the message application server 400 in the processing in step S815, and the posted file is pinned in step S818, and thereby a screen is displayed on the operation panel 301 of the mobile terminal 300. An example of the screen will now be described with reference to FIGS. 14A and 14B.

Figure 14A:
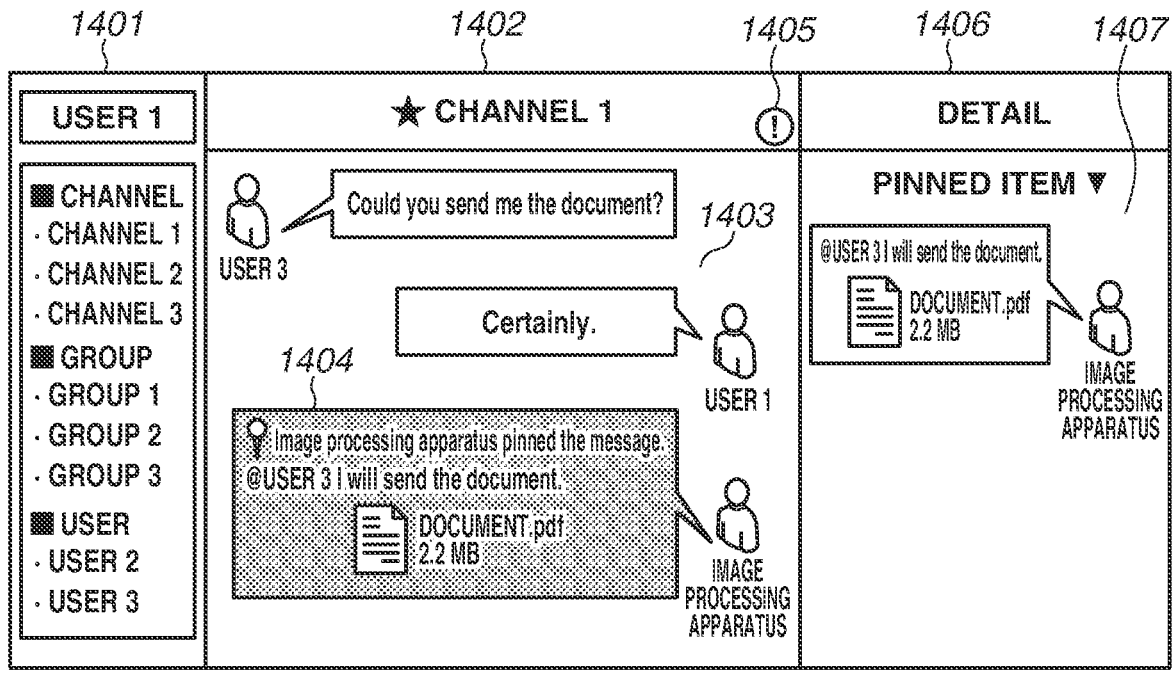
FIGS. 14A and 14B illustrate examples of message screens of a message application.
Figure 14B:
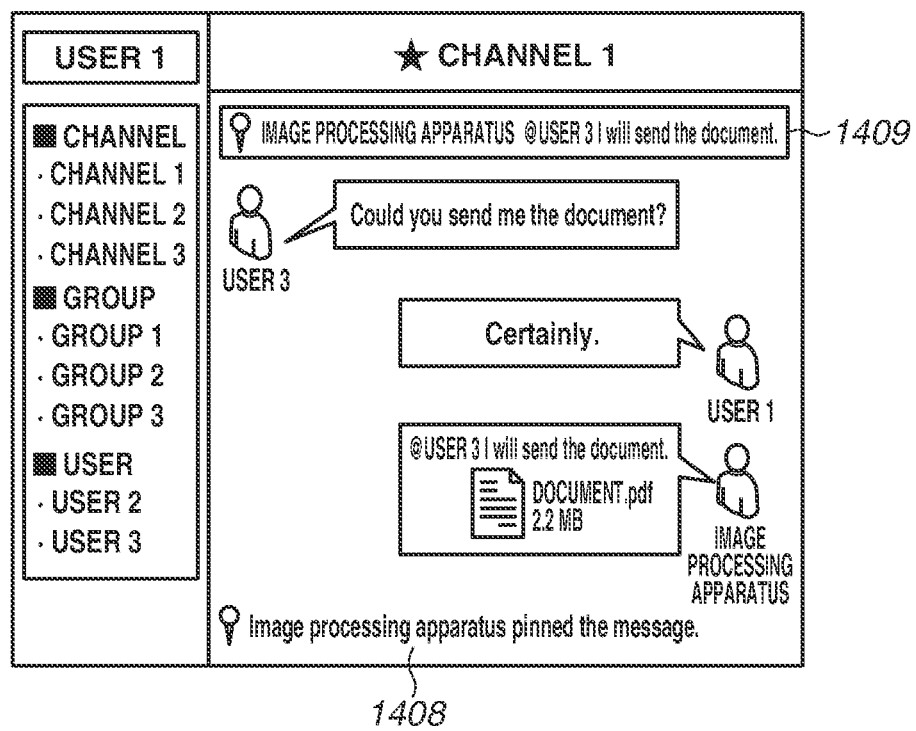

FIGS. 14A and 14B illustrate an example of a message screen of the message application. A message screen 1401 in FIG. 14A is displayed by launching the message application on the mobile terminal 300 and executing the processing in steps S815 and S818 in the image processing apparatus 101. The mobile terminal 300 also communicates with the message application server 400.

The message screen 1401 displays a channel, a group, and a user in which a logged-in user participates. The message screen 1401 also displays channel information 1402 and an exchange of message 1403. In posting a message 1404, a comment with "@" at the beginning of a user name is added to indicate that the comment is notified especially to the specified user among the other party of the post in the channel. In the case of FIG. 14A, a user 3 can notice that the post is received earlier than other members belonging to the channel by a notification delivered to a viewing terminal of the message application. In a case where the mobile terminal 300 that the user 3 views is a smartphone, the user 3 is notified using an icon notification function, vibration, or ringtone. In a case where the mobile terminal 300 that the user 3 views is a desktop terminal, the user 3 is notified by a desktop notification function or the like.

The user launches the message application on the mobile terminal 300 and logs in by inputting the user's account identification (ID) and password, and thereby a user-dedicated screen is displayed.

If a user who has an account of user 1 transmits image data generated by scanning with the image processing apparatus 101 and the post parameter to the message application server 400 and pins the post in step S818, the message 1404 is displayed (posted). FIG. 14A illustrates the example in which "channel 1" is specified as a posting channel, and "user 3" belonging to the channel 1 is specified as the user among the post parameters. FIG. 14A also illustrates the example in which "document.pdf" is specified as a file name, and "I will send the document" is specified as a comment in the post parameters. The file name and comment are specified by the user on the detail setting screen for scan-to-chat processing (not illustrated). FIG. 14A also illustrates the example in which background color of a message is changed and a pin icon and a comment "the image processing apparatus pinned the message" are displayed at an upper part of the message so that the message can be seen that the image processing apparatus 101 has pinned.

In this example, a detail screen 1406 of the channel is opened by selecting a menu button 1405 of the channel, and thereby the message 1404 is displayed as a pinned message 1407 in the detail screen 1406. If the message is selected from the list, it is possible to refer to the original message. Here, the message 1404 is pinned by the POST method of HTTP communication from the image processing apparatus 101 in step S818 in FIGS. 8A and 8B, but can be pinned using another method. For example, there is a method for opening the message screen 1401 from the mobile terminal 300, placing a mouse pointer over a message to be pinned, and selecting "Pin" from a menu screen of the message. Alternatively, the message can be pinned by pressing and holding on the message and selecting "Pin".

FIG. 14B illustrates another example of pinning in which a comment 1408 indicating that the pinning has been performed is displayed at a different location from the message, and a pinned message list 1409 is displayed at the upper part of the channel. In the pinned messages 1407 and 1409, identification information, such as the user name of the user who posted the message, is also displayed together.

The message screen in a case where pinning is performed is described with reference to FIGS. 14A and 14B. This screen is displayed by the message application server 400 enabling the pinning function for the message in step S713 in FIG. 7.

According to the first exemplary embodiment, the example is described in which the image processing apparatus 101 directly transmits image data and a post parameter to the message application server 400. According to the second exemplary embodiment, an example is described in which the image processing apparatus 101 transmits image data and a post parameter to the message application server 400 via the bot server 500.

Figure 9:
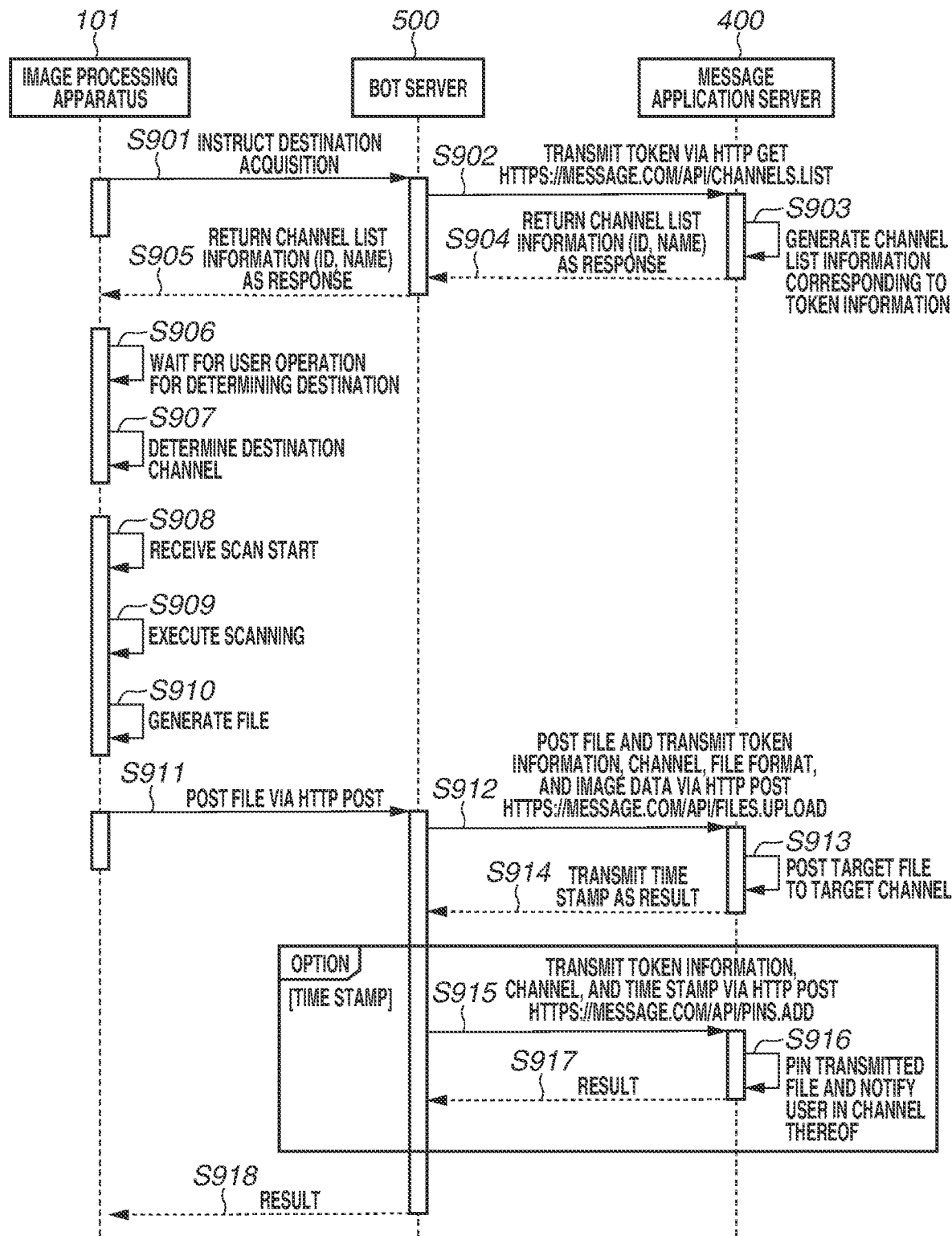
FIG. 9 illustrates an example of a sequence in which the image processing apparatus transmits a file generated by scanning to the message application server via the bot server.

FIG. 9 illustrates an example of a sequence in which the image processing apparatus 101 transmits a file generated by scanning to the message application server 400 via the bot server 500.

In step S901, the CPU 202 of the image processing apparatus 101 transmits a request for the channel list information to the bot server 500 through HTTP communication using a device ID or a user ID as a parameter.

In step S902, the CPU 501 of the bot server 500 transmits information indicating the request for the channel list information to the message application server 400 through HTTP communication using the token information corresponding to the received device ID or user ID. The token information corresponding to the device ID or the user ID received in step S901 is acquired.

In step S903, the CPU 401 of the message application server 400 checks whether access to the URL is permitted based on the token information. If the access is permitted, the CPU 401 generates the channel list information included in the work space corresponding to the token information. The channel list information is the sequence information indicating the channel information. The channel information includes a channel ID, a channel name, information indicating a user participating in the channel, and a channel setting value indicating a setting whether the channel is an archive channel.

In step S904, the CPU 401 of the message application server 400 controls the communication unit 404 to transmit the channel list information to the bot server 500 as the response information in HTTP communication.

In step S905, the CPU 501 of the bot server 500 transmits the channel list information received in step S904 to the image processing apparatus 101 as a response in HTTP communication.

Processing in steps S906 to S910 is similar to that in steps S704 to S708 in FIG. 7, so that the description thereof will be omitted.

In step S911, the CPU 202 of the image processing apparatus 101 transmits the device ID or the user ID, the information about the posting destination channel, information indicating the file format or the like, and the image data to the bot server 500 via HTTP communication.

In step S912, the CPU 501 of the bot server 500 executes processing for transmitting to the message application server 400 the information about the posting destination channel, the information indicating the file format, the image data, and the token information corresponding to the received device ID or user ID.

Here, the CPU 501 refers to a table in which the device ID or the user ID stored in the HDD 505 is associated with the token information, and determines the token information to transmit.

Processing in step S913 is similar to that in step S710, so that the description thereof is omitted.

In step S914, the CPU 401 of the message application server 400 transmits a result corresponding to whether the posting is successful and, if successful, a time stamp that can uniquely identify the posted image data to the bot server 500 as response information in HTTP communication.

In a case where the response information received by the bot server 500 from the message application server 400 in step S914 includes the time stamp that can uniquely identify the posted image data as the message at the time when the post is successful, processing in steps S915 to S917 is performed. In step S914, in a case where the bot server 500 receives the response information at the time when the post fails from the message application server 400, the processing proceeds to step S918.

In step S915, the CPU 501 transmits the information about the posting destination channel, the token information, and the time stamp information that can uniquely identify the image data posted as the message to a target channel in step S914, to the message application server 400 via the communication unit 504.

Processing in step S916 is similar to that in step S713, so that the description thereof is omitted.

In step S917, the CPU 401 of the message application server 400 transmits to the bot server 500 a result corresponding to whether the pinning is successful as the response information in HTTP communication.

In step S918, the CPU 501 of the bot server 500 transmits the result of failure in posting received in step S914 or the result corresponding to whether the pinning is successful received in step S917, to the image processing apparatus 101 as the response information in HTTP communication. In a case where processing from posting to pinning is successful, the CPU 202 of the image processing apparatus 101 can display a notification to the effect that the posting is successful on the operation unit 207. In a case where the posting or the pinning has failed, the CPU 202 of the image processing apparatus 101 can also display a notification to the effect that the posting or the pinning has failed on the operation unit 207. Further, in a case where the processing from posting to pinning is successful, no notification is displayed, and only in a case where the posting or the pinning has failed, a notification to the effect that the posting has failed can be displayed.

According to the present exemplary embodiment, the channel list is acquired, but a group list with access restriction and a user list for an individual post can also be posted in a similar manner.

Figure 10:
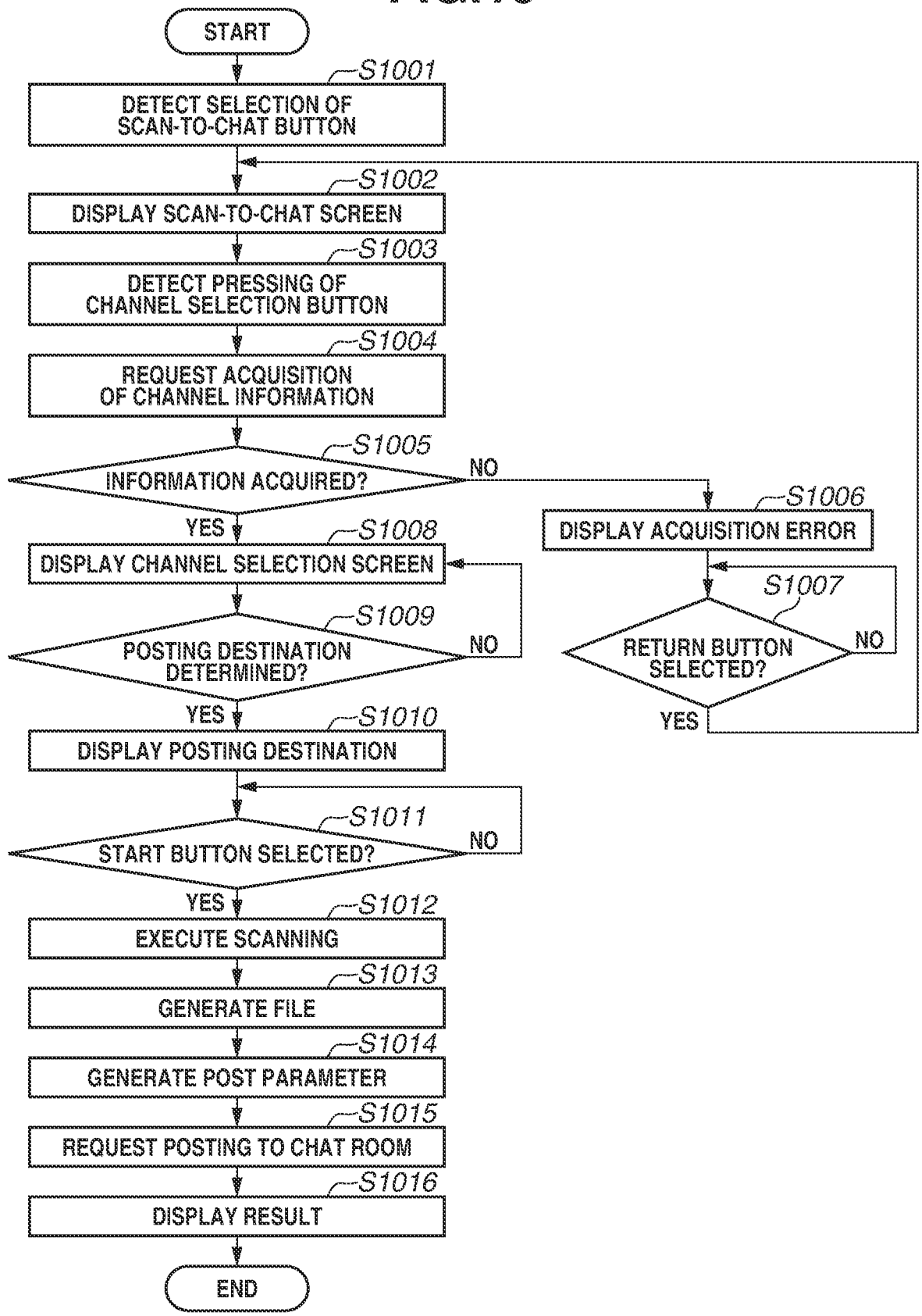
FIG. 10 is a flowchart illustrating an example of scan-to-chat processing.

FIG. 10 is a flowchart illustrating an example of scan-to-chat processing. The processing in the flowchart in FIG. 10 is executed by the CPU 202 reading a program stored in the ROM 203 to the RAM 204 and executing the program. The processing in the flowchart in FIG. 10 is also started if the power supply of the image processing apparatus 101 is turned on.

Processing in steps S1001 to S1003 is similar to that in steps S801 to S803, so that the description thereof is omitted.

In step S1004, the CPU 202 acquires the user ID of the user who has logged into the image processing apparatus 101 or the device ID of the image processing apparatus 101, and transmits a channel information acquisition request and the user ID or the device ID to the bot server 500 through HTTP communication.

Processing in steps S1005 to S1014 is similar to that in steps S805 to S814, so that the description thereof is omitted.

In step S1015, the CPU 202 transmits the user ID of the user who has logged into the image processing apparatus 101 or the device ID of the image processing apparatus 101, the file generated in step S1013, and the post parameter. In the first exemplary embodiment, the example is described in which the file is transmitted to the message application server 400 by using the token information 1303 registered in advance. However, the present disclosure is not limited to this example. For example, the storage 205 of the image processing apparatus 101 can store the user ID or the device ID in association with the token information, and execute transmission of the request and the file by using the token information corresponding to the user ID of the logged-in user or the device ID.

According to the present exemplary embodiment, the user ID of the logged-in user or the device ID is used in communication with the bot server 500, but a tenant ID or the like can also be used as long as the user ID or the device ID is a uniquely determined identifier.

Figure 11A:
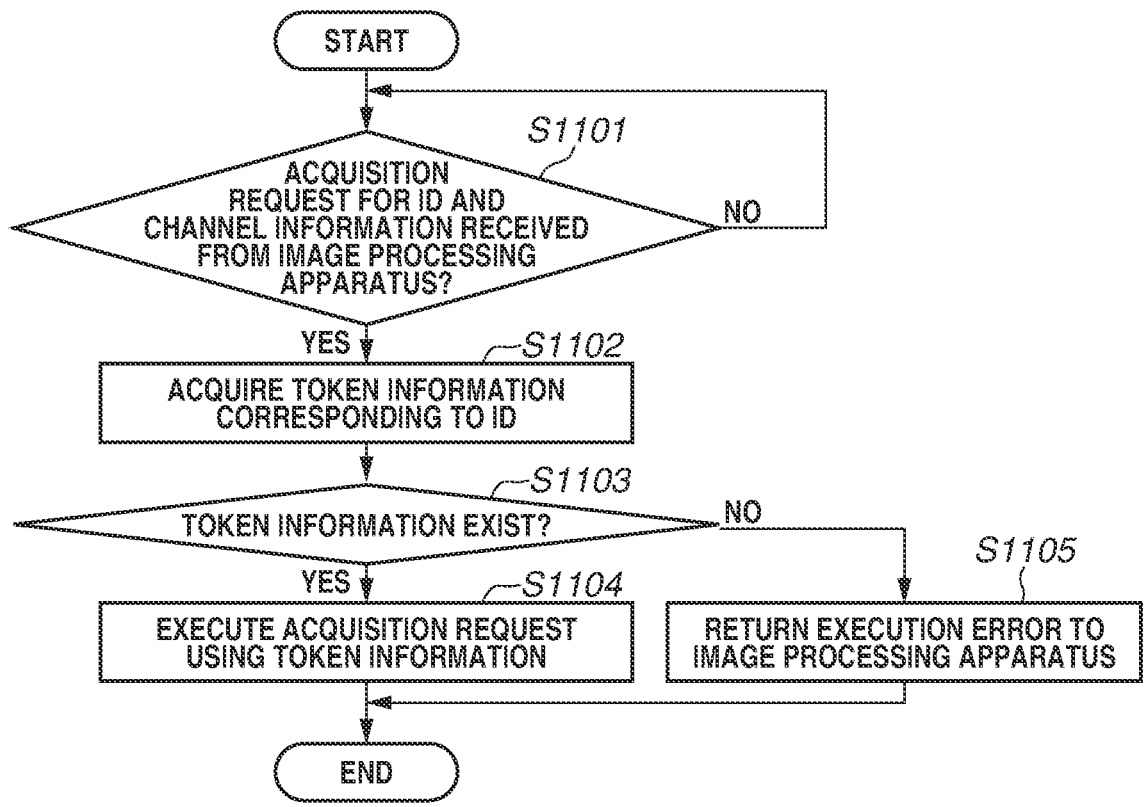
FIGS. 11A and 11B are flowcharts illustrating an example of processing in the bot server.
Figure 11B:
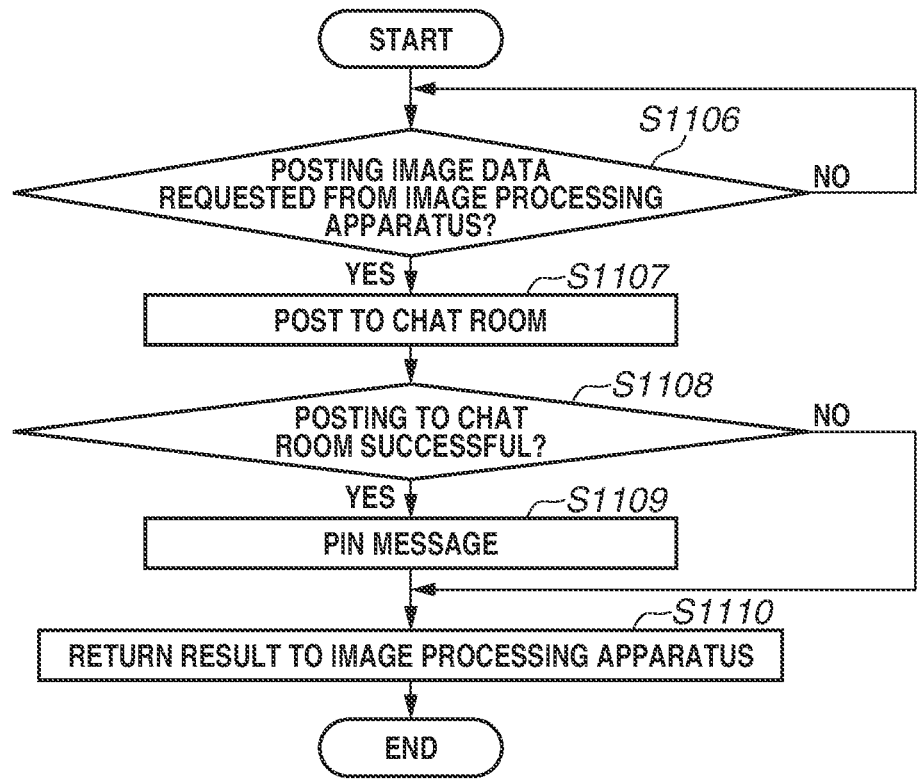

FIGS. 11A and 11B are flowcharts illustrating examples of processing in the bot server 500. FIG. 11A is a flowchart illustrating an example of processing in a case where the bot server 500 acquires an ID of the message application server 400 and the channel information. FIG. 11B is a flowchart illustrating an example of processing in a case where the bot server 500 transmits image data to the message application server 400. The processing in FIGS. 11A and 11B is executed by the CPU 501 reading a program stored in the ROM 502 to the RAM 503 and executing the program.

First, FIG. 11A will be described. In step S1101, the CPU 501 determines whether an information acquisition request for acquiring the device ID or the user ID and the channel information is received from the image processing apparatus 101. In a case where it is determined that the request is received (YES in step S1101), the processing proceeds to step S1102. Otherwise (NO in step S1101), the processing returns to step S1101.

In step S1102, the CPU 501 acquires the token information corresponding to the device ID or the user ID received from the image processing apparatus 101.

In step S1103, the CPU 501 determines whether the token information corresponding to the received device ID or user ID exists. In a case where it is determined that the token information exists (YES in step S1103), the processing proceeds to step S1104.

Otherwise (NO in step S1103), the processing proceeds to step S1105. Further, in the case where it is determined that the token information exists, the RAM 503 stores the token information corresponding to the received device ID or user ID.

In step S1104, the CPU 501 transmits the information acquisition request received from the image processing apparatus 101 in step S1101 to the message application server 400 using the token information specified in step S1103. Information returned from the message application server 400 in response to the transmission is transmitted to the image processing apparatus 101.

In step S1105, the CPU 501 transmits information indicating an execution error to the image processing apparatus 101 as a response to the request received in step S1101.

Next, the example of processing in a case where the bot server 500 transmits image data to the message application server 400 in FIG. 11B will be described.

In step S1106, the CPU 501 determines whether a request to post the image data is received from the image processing apparatus 101. In a case where it is determined that the request is received (YES in step S1106), the processing proceeds to step S1107. Otherwise (NO in step S1106), the processing returns to step S1106.

In step S1107, the CPU 501 transmits to the message application server 400 the information about the posting destination channel received from the image processing apparatus 101, the ID of the user who has logged into the image processing apparatus 101 or the ID of the image processing apparatus 101, the image data, and the post parameter.

In step S1108, the CPU 501 receives a result corresponding to whether the posting is successful and, if successful, the time stamp that can uniquely identify the image data posted as the message from the message application server 400, and determines whether the posting is successful. In a case where it is determined as successful (YES in step S1108), the processing proceeds to step S1109. Otherwise (NO in step S1108), the processing proceeds to step S1110.

In step S1109, the CPU 501 transmits to the message application server 400 the information about the posting destination channel, the token information, and the time stamp information that can uniquely identify the image data posted to the target channel in step S1107.

In step S1110, the CPU 501 transmits to the image processing apparatus 101 a result of failure in posting to the message application server 400 in step S1107 or a result of whether pinning of the image data is successful in step S1109.

According to the present exemplary embodiment, even in a case where an interface specification of the message application server 400 is changed, the present disclosure can be realized by only updating the program of the bot server 500 without uploading the program of the image processing apparatus 101. Further, in a workplace having a plurality of image processing apparatuses, it is possible to post a file without individually setting a token for each image processing apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-132247, filed Aug. 23, 2022, which is hereby incorporated by reference herein in its entirety.

What is claimed is:

1. A scanning apparatus comprising:
a scanner that scans a document to generate image data; and
a communicator that transmits to a chat server the image data generated by the scanner and a pinning request to pin a post including the image data in a talk room; and
a controller that receives from a user a first setting or a second setting before the image data is transmitted by the communicator,
wherein, in a case where there is a pinned post in the talk room when the image data is transmitted by the communicator and where the first setting is received, the pinning of the pinned post is released, the image data transmitted by the communicator is posted to the talk room, and the post including the image data is pinned in the talk room, and
wherein, in a case where there is the pinned post in the talk room when the image data is transmitted by the communicator and where the second setting is received, the pinning of the pinned post is not released, the image data transmitted by the communicator is posted to the talk room, and the post including the image data is not pinned in the talk room.

2. The scanning apparatus according to claim 1, wherein the controller accepts specification of a talk room from the user, wherein the communicator transmits to the chat server the image data generated by the scanner, information about the talk room, and the pinning request, and wherein the image data transmitted by the communicator is posted to the specified talk room, and the post including the image data is pinned in the specified talk room.

3. The scanning apparatus according to claim 2, wherein the communicator receives information about a plurality of talk rooms from the chat server, wherein the controller accepts specification of the talk room from the plurality of talk rooms indicated by the information about the plurality of talk rooms received by the communicator.

4. The scanning apparatus according to claim 1, wherein the post further includes identification information about the user who posts the image data.

5. The scanning apparatus according to claim 1, wherein the scanner scans a plurality of conveyed documents and generates a plurality of pieces of image data.

6. The scanning apparatus according to claim 1, wherein the controller accepts an execution instruction from the user, wherein the scanner scans the document and generates image data in response to acceptance of the execution instruction by the controller, and the communicator transmits the generated image data and the pinning request to the chat server.

7. A method for processing an image, the method comprising:

scanning a document to generate image data;

transmitting to a chat server the image data generated by the scanning and a pinning request to pin a post including the image data in a talk room; and receiving from a user a first setting or a second setting before the image data is transmitted, wherein, in a case where there is a pinned post in the talk room when the image data is transmitted and where the first setting is received, the pinning of the pinned post is released, the image data transmitted is posted to the talk room, and the post including the image data is pinned in the talk room, and wherein, in a case where there is the pinned post in the talk room when the image data is transmitted and where the second setting is received, the pinning of the pinned post is not released, the image data transmitted is posted to the talk room, and the post including the image data is not pinned in the talk room.

8. The method according to claim 7, further comprising accepting specification of a talk room from the user, wherein the image data generated in the scanning, information about the talk room, and the pinning request are transmitted to the chat server in the transmitting, wherein the image data transmitted in the transmitting is posted to the specified talk room, and wherein the post including the image data is pinned in the specified talk room.

9. The method according to claim 8, further comprising receiving information about a plurality of talk rooms from the chat server, wherein specification of the talk room from the plurality of talk rooms indicated by the information about the plurality of talk rooms received in the receiving is accepted in the accepting.

10. The method according to claim 7, wherein the post further includes identification information about the user who posts the image data.

11. The method according to claim 7, wherein a plurality of conveyed documents is scanned in the scanning, and a plurality of pieces of image data is generated.

12. The method according to claim 7, further comprising accepting an execution instruction from the user, wherein the document is scanned and image data is generated in the scanning in response to accepting of the execution instruction, and the generated image data and the pinning request are transmitted to the chat server.

13. A non-transitory computer readable storage medium storing a program causing a computer to execute a method for processing an image, the method comprising:

scanning a document to generate image data;

transmitting to a chat server the image data generated by the scanning and a pinning request to pin a post including the image data in a talk room; and receiving from a user a first setting or a second setting before the image data is transmitted, wherein, in a case where there is a pinned post in the talk room when the image data is transmitted and where the first setting is received, the pinning of the pinned post is released, the image data transmitted is posted to the talk room, and the post including the image data is pinned in the talk room, and wherein, in a case where there is the pinned post in the talk room when the image data is transmitted and where the second setting is received, the pinning of the pinned post is not released, the image data transmitted is posted to the talk room, and the post including the image data is not pinned in the talk room.

* * * * *